(12) United States Patent
Yagi

(10) Patent No.: US 6,211,532 B1
(45) Date of Patent: *Apr. 3, 2001

(54) MICROPROBE CHIP FOR DETECTING EVANESCENT WAVES PROBE PROVIDED WITH THE MICROPROBE CHIP AND EVANESCENT WAVE DETECTOR, NEARFIELD SCANNING OPTICAL MICROSCOPE, AND INFORMATION REGENERATOR PROVIDED WITH THE MICROPROBE CHIP

(75) Inventor: Takayuki Yagi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,016

(22) Filed: Jan. 9, 1998

(30) Foreign Application Priority Data

Jan. 13, 1997 (JP) .................................................... 9-015823

(51) Int. Cl.$^7$ .................................................... H01L 31/00
(52) U.S. Cl. .............................. 257/40; 257/53; 257/466; 250/310; 250/559.06; 250/559.07
(58) Field of Search ................................. 257/53, 40, 466; 250/310, 559.06, 559.07

(56) References Cited

U.S. PATENT DOCUMENTS

| Re. 35,514 | * | 5/1997 | Albrecht et al. | 250/216 |
|---|---|---|---|---|
| 5,221,415 | | 6/1993 | Albrecht et al. | 156/629 |
| 5,321,685 | | 6/1994 | Nose et al. | 369/126 |
| 5,363,697 | * | 11/1994 | Nakagawa | 73/105 |
| 5,450,203 | * | 9/1995 | Penkethman | 356/373 |
| 5,546,375 | | 8/1996 | Shimada et al. | 369/126 |

FOREIGN PATENT DOCUMENTS

| 43 20 095 A1 | | 5/1994 | (DE) . |
|---|---|---|---|
| 4-343280 | * | 11/1992 | (JP) . |
| 5-066127 | * | 3/1993 | (JP) . |
| 5-325274 | * | 12/1993 | (JP) . |
| 7-005182 | * | 1/1995 | (JP) . |
| 8-262036 | * | 10/1996 | (JP) . |
| 4119907 | * | 1/1998 | (JP) . |

OTHER PUBLICATIONS

Hosaka S: "SPM Based Storage", IEEE Transactions on Magnetics, US, IEEE Inc. New York, vol. 32, No. 3, pp. 1873–1877.

Akamine S et al: "Development of a Microphotocantilever for Near–Field Scanning Optical Microscopy", Proceedings of the Workshop on Micro Electrical Mechanical Systems, US, New York, IEEE, vol. Workshop 8, pp. 145–150.

(List continued on next page.)

Primary Examiner—William Mintel
(74) Attorney, Agent, or Firm—Fitzpatrick, Cella, Harper & Scinto

(57) ABSTRACT

A microprobe chip for detecting evanescent waves includes a photoconductive material and a substrate for supporting the photoconductive material. The photoconductive material is connected to electrodes formed on the substrate. A method for making a microprobe chip for detecting evanescent waves includes forming a film comprising a photoconductive material on a peeling layer of a first substrate, the film having a shape of the microprobe chip, and transferring the film on the peeling layer onto a junction layer provided on a second substrate. A method for making a probe provided with a microprobe chip for detecting evanescent waves includes forming a film comprising a photoconductive material and having the shape of the microprobe chip on a peeling layer of a first substrate, forming a thin film cantilever on a second substrate, and transferring the film on the peeling layer onto a junction layer formed on the thin film cantilever.

13 Claims, 9 Drawing Sheets

OTHER PUBLICATIONS

"Surface Studies by Scanning Tunneling Microscopy" by Binning, et al., Physical Review Letters, vol. 49, No. 1, pp. 57–60 (Jul. 1982).

"Collection Mode Near–Field Scanning Optical Miroscopy" by E. Betzig, et al., Applied Physics Letters, vol. 51, No. 22, pp. 2088–2090, (Dec. 1987).

"Near–Field Optical Microscope Using a Silicon–Nitride Probe" N.F. van Hulst, et al., Applied Physics Letters, vol. 62, No. 5, pp. 461–463 (Feb. 1993).

"Development of a Microphotocantilever for Near–Field Scanning Optical Microscopy" by Akamine et al., Micro Electro Mechanical Systems, IEEE Catalog No. 95CH35754, pp. 145–149, (Jan. 29, Feb. 2, 1995).

* cited by examiner

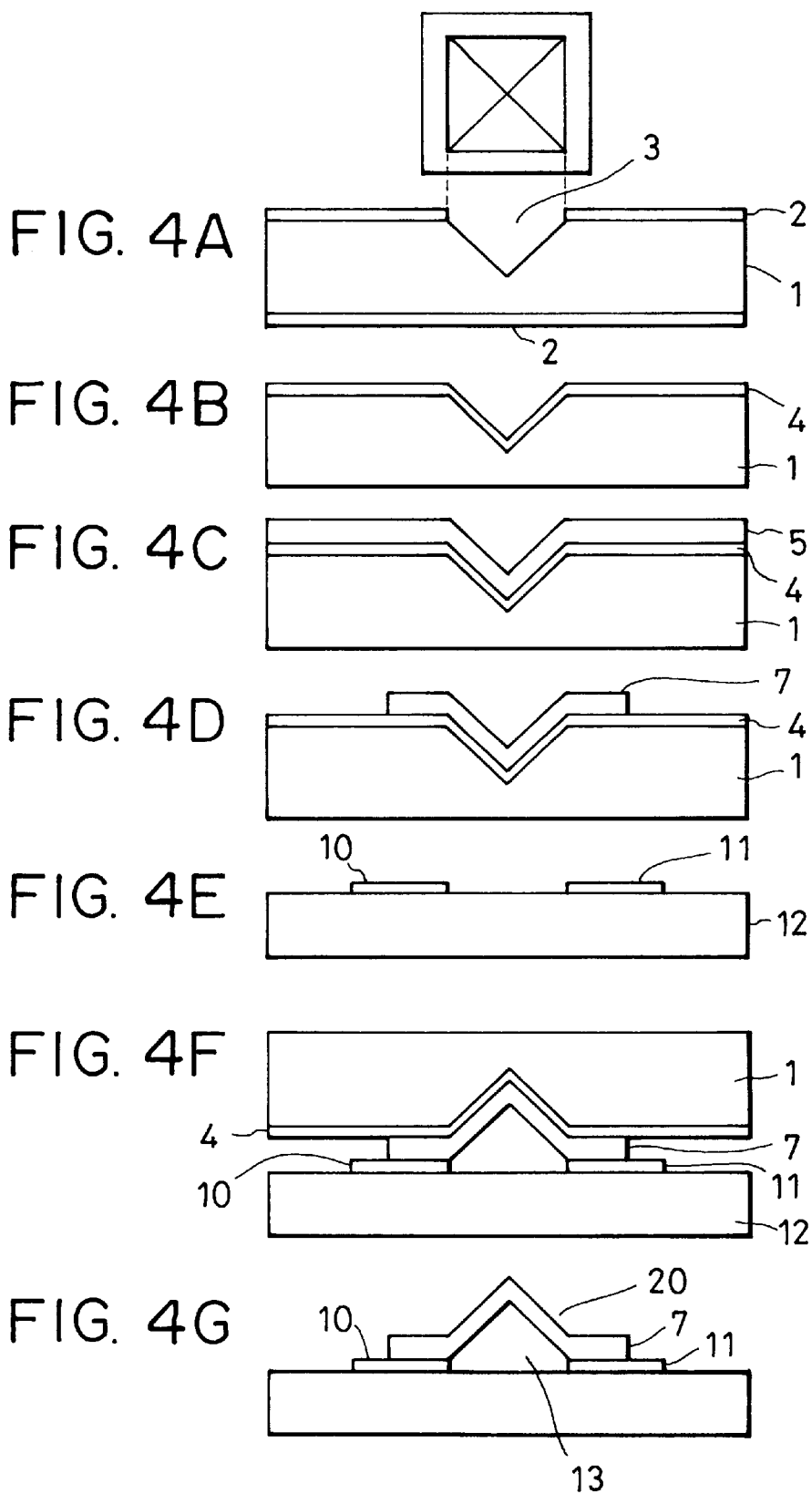

MICROPROBE CHIP FOR DETECTING EVANESCENT WAVES PROBE PROVIDED WITH THE MICROPROBE CHIP AND EVANESCENT WAVE DETECTOR, NEARFIELD SCANNING OPTICAL MICROSCOPE, AND INFORMATION REGENERATOR PROVIDED WITH THE MICROPROBE CHIP

BACKGROUND OF THE INVENTION

1. Field of the Invention

The present invention relates to a microprobe chip for detecting evanescent waves which is used in near-field scanning optical microscopes and a method for making the same, a probe including a thin film cantilever provided with the microprobe chip and a method for making the same, an evanescent wave detector, a near-field scanning optical microscope, and an information regenerator provided with the microprobe chip. In particular, the present invention relates to a microprobe chip having a tip with a small curvature, which is suitable for these apparatuses, and a method for making the same which is capable of producing the microprobe chip with high productivity.

2. Related Background Art

A scanning tunnel microscope (hereinafter referred to as an STM) was developed by G. Binning et al. in 1983 (Phys. Rev. Lett., 49, 57 (1983)). The STM can directly observe electronic structures of surface atoms on conductive materials, such as single crystals and amorphous materials and can obtain real space images with high resolution. Thus, various scanning probe microscopes (hereinafter referred to as SPMs) have been intensively investigated in microstructure analysis of materials.

Examples of SPMs include scanning tunnel microscopes, atomic force microscopes (AFMs), magnetic force microscopes (MFMs), and near-field scanning optical microscopes (NSOMs), which detect the surface structure of a material by means of changes in tunnel currents, atomic forces, magnetic forces, and light intensities, respectively. Such changes occur when scanning near the surface of the material with probes provided with microprobe chips.

Among these SPMs, NSOMs permit nondestructive measurement of fine patterns on tested materials with high resolution, that is, a positional resolution of less than $\lambda/2$, which has not been achieved by conventional optical microscopes, by using evanescent light radiated from a fine pinhole. Further, NSOMs are applicable to various materials which have not been observed by any conventional method, such as organisms and biological cells.

The evanescent waves are detected by the following three methods.

The first method was developed by E. Betzig, et al. ("Collection Mode Near-Field Scanning Optical Microscopy", Appl. Phys. Lett. 51(25), pp. 2088–2090 (1987)). Illuminating light is incident on the back surface of a test piece so as to satisfy the total reflection condition, and the evanescent waves occurring on the front surface of the test piece due to the illuminating light are detected with a microprobe chip provided with a fine aperture. This method is capable of obtaining evanescent wave images with high resolution, and thus has been most intensively studied.

The microprobe chip is composed of a glass pipette or optical fiber of which the tip is pointed. It is therefore fabricated by mechanical polishing or the like, with low productivity and high production costs. Further, the aperture is hardly ever formed with satisfactory reproducibility and high accuracy.

The second method uses a thin film cantilever composed of a silicon nitride thin film used in AFMs instead of the aperture to detect the scattered light of evanescent waves (N. F. van Hulst, et al., "Near-Field Optical Microscope Using a Silicon-Nitride Probe", Appl. Phys. Lett. 62(5), pp. 461–463 (1993)).

A typical microprobe chip used in the second method and a method for making the microprobe chip are disclosed in U.S. Pat. No. 5,221,415, in which the microprobe chip is formed by anisotropic etching of single-crystal silicon in the crystal axes by means of a semiconductor production process. As shown in FIG. 1, a pit 518 is formed on a silicon wafer 514 covered with silicon dioxide masks 510 and 512 by an anisotropic etching process, the silicon dioxide masks 510 and 512 are removed, and then the silicon wafer 514 is covered with silicon nitride layers 520 and 521. The silicon nitride layer 520 has a pyramidal pit 522 directly on top of the pit 518. After the silicon nitride layer 521 on the bottom surface is removed, a glass plate 530 provided with a sawcut 534 and a Cr layer 532 is joined to the silicon nitride layer 520. The silicon wafer 514 is removed by etching. As a result, a probe consisting of a microprobe chip and a cantilever which are composed of silicon nitride is replicated on a mounting block. When the probe is used in an optical lever-type AFM, a metal film 542 as a reflecting film is formed on the bottom surface. The probe can be produced with high productivity and reproducibility and has a pointed tip. The probe, however, forms a lower resolution NSOM image than that formed by a probe with an aperture produced by the first method.

In the first and second methods, the microprobe chip is used as an optical pickup and the scattered evanescent-wave light is amplified by a photomultiplier cell provided above the microprobe chip. On the other hand, the third method involves direct detection of scattered evanescent-wave light using a photodiode on a thin film cantilever (S. Akamine, et al., "Development of a Microphotocantilever for Near-Field Scanning Optical Microscopy", Proceedings of the IEEE MicroElectro Mechanical Systems Workshop 1995, pp. 145–150). FIG. 2 is a cross-sectional view of a microprobe chip produced by the third method. The microprobe chip consists of a p-silicon thin film cantilever 601 of which one end is supported by a silicon substrate 600, a photodiode of pn junction 603 formed by providing an n layer 602, a silicon oxide film 604 provided thereon, and an aluminum wiring layer 605 provided on the silicon oxide film 604 which extracts scattered light signals from the photodiode. The lower face of the thin film cantilever is provided with an etch stop layer 606 which is used for producing the cantilever.

It is possible for the photodiode optical detector provided on the free end of the cantilever to approach the test piece, and hence the SN ratio and resolution can be improved. Further, the photodiode optical detector can simplify the system configuration. In the third method, however, the thin film cantilever, as a microprobe chip, is produced by a photolithographic process and an etching process with poor reproducibility, and hence microprobe chips having the same shape cannot be produced in the same production lot.

SUMMARY OF THE INVENTION

It is an object of the present invention to solve the above-mentioned problems of the prior art technologies.

It is another object of the present invention to provide a microprobe chip for detecting evanescent waves having a high SN ratio and a high resolution and a method for making the same, a probe provided with the microprobe chip and a method for making the same, an evanescent wave detector, a near-field scanning optical microscope, and an information regenerator which are provided with the microprobe chip and which have simplified system configurations.

It is a further object of the present invention to provide a method for making, with high reproducibility, a microprobe chip having a pointed tip for detecting evanescent waves, and a method for making a probe provided with the microprobe chip.

It is still another object of the present invention to provide a method for making a microprobe chip for detecting evanescent waves which permits reuse of a female mold and provides high yield and low cost production, and a method for making a probe in which the microprobe chip is provided on a thin film cantilever.

A first aspect of the present invention is a microprobe chip for detecting evanescent waves comprising a photoconductive material and a substrate for supporting the photoconductive material, the photoconductive material being connected to electrodes formed on the substrate.

A second aspect of the present invention is a method for making a microprobe chip for detecting evanescent waves comprising the following steps of: forming a film composed of a photoconductive material on a peeling layer of a first substrate, the film having the shape of the microprobe chip; and transferring the film on the peeling layer onto a junction layer on a second substrate.

A third aspect of with the present invention is a probe comprising a microprobe chip for detecting evanescent waves, an end of the microprobe chip composed of a photoconductive material being connected to electrodes formed on the free end of the thin film cantilever, and the other end of the thin film cantilever being fixed to a substrate.

A fourth aspect in accordance with the present invention is a method for making a probe provided with a microprobe chip for detecting evanescent waves comprising the following steps of: forming a film comprising a photoconductive material and having the shape of the microprobe chip on a peeling layer of a first substrate; forming a thin film cantilever on a second substrate; and transferring the film on the peeling layer onto a junction layer formed on the thin film cantilever.

A fifth aspect of the present invention is an apparatus for detecting evanescent waves comprising: a microprobe chip comprising a photoconductive material; a substrate provided with electrodes thereon for supporting a tip of the microprobe chip; a unit for applying a voltage to the microprobe chip through the electrodes; and a unit for detecting photocurrent flows in the microprobe chip through the electrodes, wherein the evanescent waves are detected as the photocurrent flows.

A sixth aspect of the present invention is an apparatus for observing a surface of a test piece using evanescent waves comprising: a microprobe chip comprising a photoconductive material; a substrate provided with electrodes thereon for supporting a tip of the microprobe chip; a unit for radiating light onto the test piece; a unit for applying a voltage to the microprobe chip through the electrodes; and a unit for detecting photocurrent flows in the microprobe chip through the electrodes. In this aspect, the evanescent waves occurring on the test piece by the unit for radiating light are converted into photocurrent flows by the unit for applying a voltage and the microprobe chip, and are detected as the photocurrent flows to provide the desired surface information relating to the test piece.

A seventh aspect of the present invention is an apparatus for regenerating information on a recording medium using evanescent waves comprising: a microprobe chip comprising a photoconductive material; a substrate provided with electrodes thereon for supporting a tip of the microprobe chip; a unit for radiating light onto the test piece; a unit for applying a voltage to the microprobe chip through the electrodes; and a unit for detecting photocurrent flows in the microprobe chip through the electrodes. The evanescent waves occurring on the test piece by the unit for radiating light are converted into photocurrent flows by the unit for applying a voltage and the microprobe chip, and are detected as the photocurrent flows, to provide the desired information that is on the recording medium.

BRIEF DESCRIPTION OF THE DRAWINGS

FIGS. 4A to 4G are cross-sectional views of manufacturing steps of a microprobe chip in accordance with Embodiment 1 of the present invention;

DETAILED DESCRIPTION OF THE PREFERRED EMBODIMENTS

Figure 1:
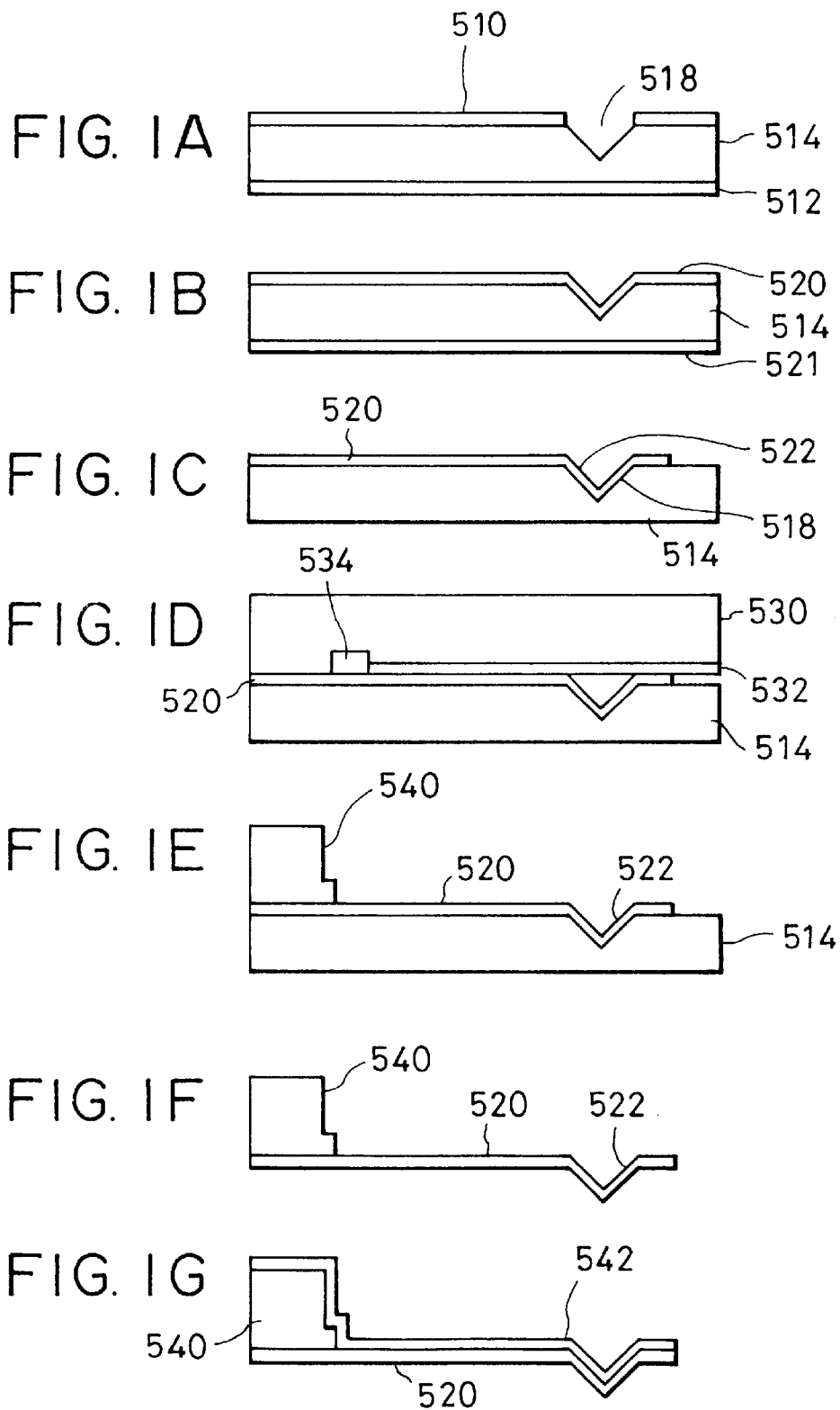
FIGS. 1A to 1G are cross-sectional views of the main steps of a method for making a prior-art microprobe chip.
Figure 2:
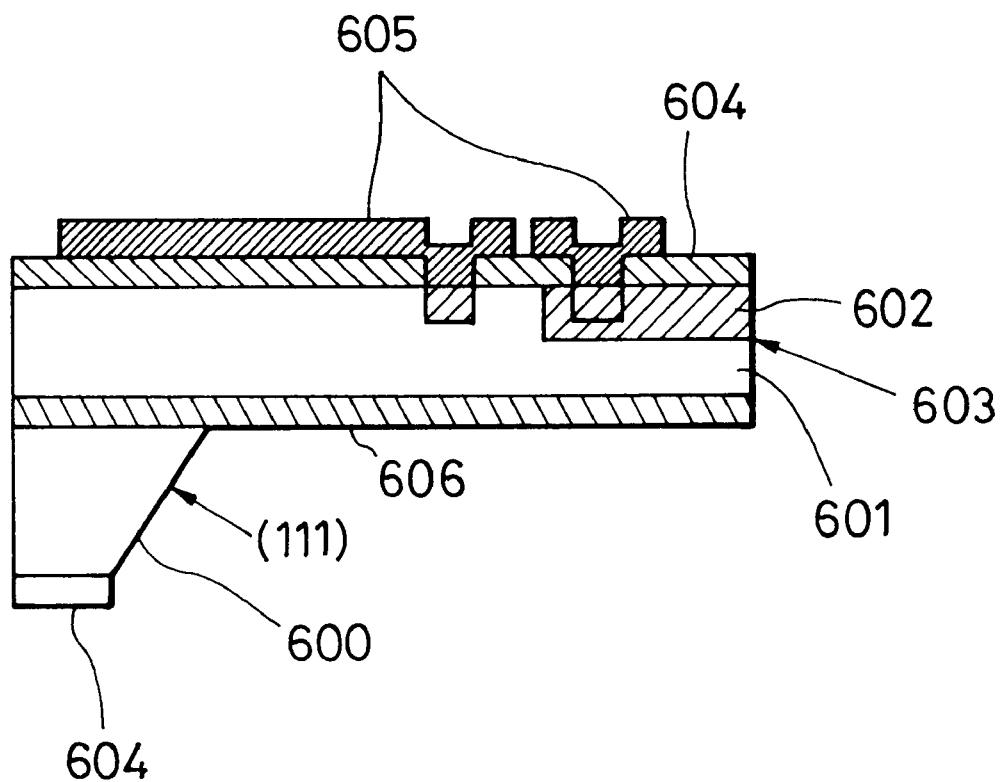
FIG. 2 is a cross-sectional view of a prior-art microprobe chip.

In the present invention, the microprobe chip is formed of a photoconductive material, and hence the microprobe chip functions as a photodetector with a high SN ratio and a high resolution. Further, the photoconductive layer formed on the peeling layer on the first substrate is transferred onto the junction layer on the second substrate. The microprobe chip can therefore be produced by the junction and transferring steps with great ease, high accuracy, and high productivity, without removing the first substrate by etching. Since the photoconductive layer, or the peeling layer and the photoconductive layer are formed after the transferring step, the first substrate can be repeatedly used as the female mold. The use of such a female mold enables the reduction in the production costs and an improvement in the reproducibility of the shapes of microprobe chips in the continuous production.

Preferably, the first substrate is composed of single-crystal silicon, and an indented section composed of a plane (111) is formed on the first substrate by anisotropic crystal-axis etching. Since the material for the microprobe chip is deposited on the single-crystal substrate with the indented section, the tip of the microprobe chip is pointed. When a plurality of microprobe chips are formed using the same substrate, the pointed tips are regular in shape, and thus the microprobe chips are uniform in characteristics.

The curvature of the tip of the microprobe chip can be reduced by forming a silicon oxide ($SiO_2$) film by means of thermal oxidation of the silicon first substrate. The thickness of the silicon dioxide film depends on the shape of the silicon substrate. The curvature is therefore determined by controlling the thickness of the silicon oxide film formed by the thermal oxidation.

Materials suitable for the peeling layer must readily peel from the photoconductive layer and the first substrate; in other words, the materials must have little reactivity and contact characteristics with the photoconductive layer and the first substrate. Preferable materials may be selected from various metals, semiconductors, and insulators in view of a combination of the photoconductive layer and the first substrate. For example, when an amorphous inorganic semiconductor is used as the photoconductive material, it is preferable that the peeling layer be a noble metal, such as platinum or an alloy thereof, which is not reactive to and does not come into contact with the photoconductive layer. When a silicon substrate is used, a preferable material for the peeling layer is silver. Since silver, having a high light reflectance, however, inhibits transmission of the evanescent waves into the photoconductive layer, the silver peeling layer on the photoconductive layer must be removed after removing the first substrate.

The peeling layer is formed on the indented section of the first substrate by a thin film deposition process so that the thickness of the peeling layer does not significantly change. The shape of the indented section can thereby be maintained. Examples of thin film deposition processes having high reproducibility of the film thickness include vacuum processes, such as resistance heating evaporation processes, electron beam evaporation processes, chemical vapor deposition (CVD) processes, and sputtering processes.

The photoconductive material absorbs the incident light and forms an electric charge without a pn barrier or a depletion layer. A voltage is applied between the ends of the photoconductive material, and the formed electric charge is detected as a photocurrent by a current detecting unit. In the present invention, using the photoconductive characteristics of the photoconductive material, the photoconductive layer of the microprobe chip absorbs the evanescent waves scattered from the surface of the test piece, and the photocurrent formed by the voltage applied to the photoconductive layer is detected. The information on the surface of the test piece is therefore detected as a change in the photocurrent.

Since the photoconductive layer is formed on the indented section provided on the first substrate, it is preferable that the photoconductive layer is formed by a thin film deposition process. Amorphous inorganic semiconductive materials, such as amorphous silicon and amorphous chalcogenide, are preferably used as materials for forming the photoconductive layers, since they can easily form the photoconductive layers at lower temperatures. Organic photoconductive materials are also preferable because they are superior to the amorphous inorganic semiconductive materials in mass-productivity, production costs, and safety.

The junction layer is formed on the substrate or the thin film cantilever, and preferably is composed of a metallic material, since electrodes provided for leading the formed photocurrent are generally used as the junction layers to simplify the production process. The photoconductive layer is preferably joined to the junction layer by a direct joining process. When using amorphous silicon as the photoconductive layer, for example, materials forming silicide are selected for the junction layer.

When using materials, such as organic materials, which are generally not reactive with metals, for forming the photoconductive layer, a metallic layer may be provided between the photoconductive layer and the junction layer to assist joining them.

The junction layer and the electrodes for leading the photocurrent may be formed by known thin film deposition processes, such as vacuum deposition processes, sputtering processes, CVD processes, plating processes, and coating processes, and may be patterned into a given pattern by photolithographic and etching processes.

In the present invention, a cantilever-type probe having a free end provided with a microprobe chip can be fabricated as follows. A thin film which will be used as a thin-film cantilever later is formed on the second substrate, and a patterned junction layer is formed on the thin film at the position which functions as the free end. After the photoconductive layer with the peeling layer is transferred by joining to the junction layer, the part of the second substrate which lies under the thin-film cantilever is removed so that one end of the thin-film cantilever is fixed to the second substrate. A cantilever-type probe having a free end provided with a microprobe chip is thereby obtained.

The indented shape on the first substrate is replicated to the microprobe chip with high reproducibility, and a gap is formed between the photoconductive layer and the junction layer. The microprobe chip provided at the free end of the thin film cantilever is lightweight, and thus the resonant frequency of the cantilever with the microprobe chip is not decreased.

Embodiments of the present invention will now be described in detail with reference to the attached drawings.

[Embodiment 1]

Figure 3A:
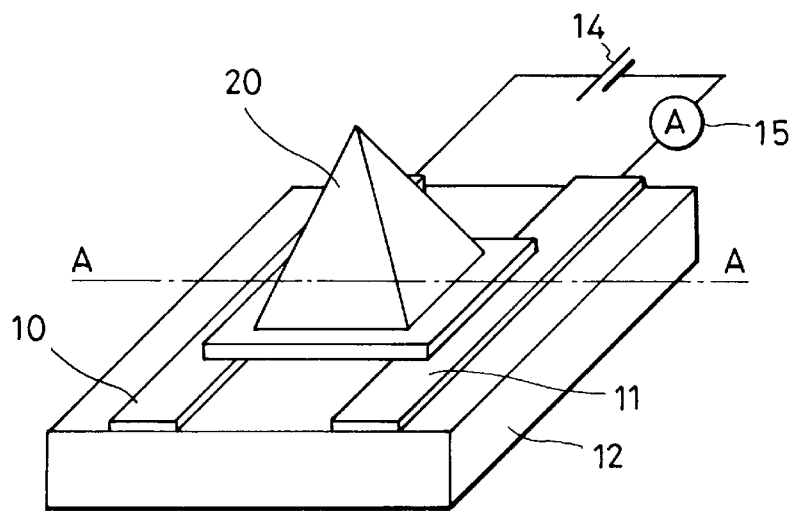
FIG. 3A is an isometric view of an evanescent wave detecting apparatus in accordance with the present invention.
Figure 3B:
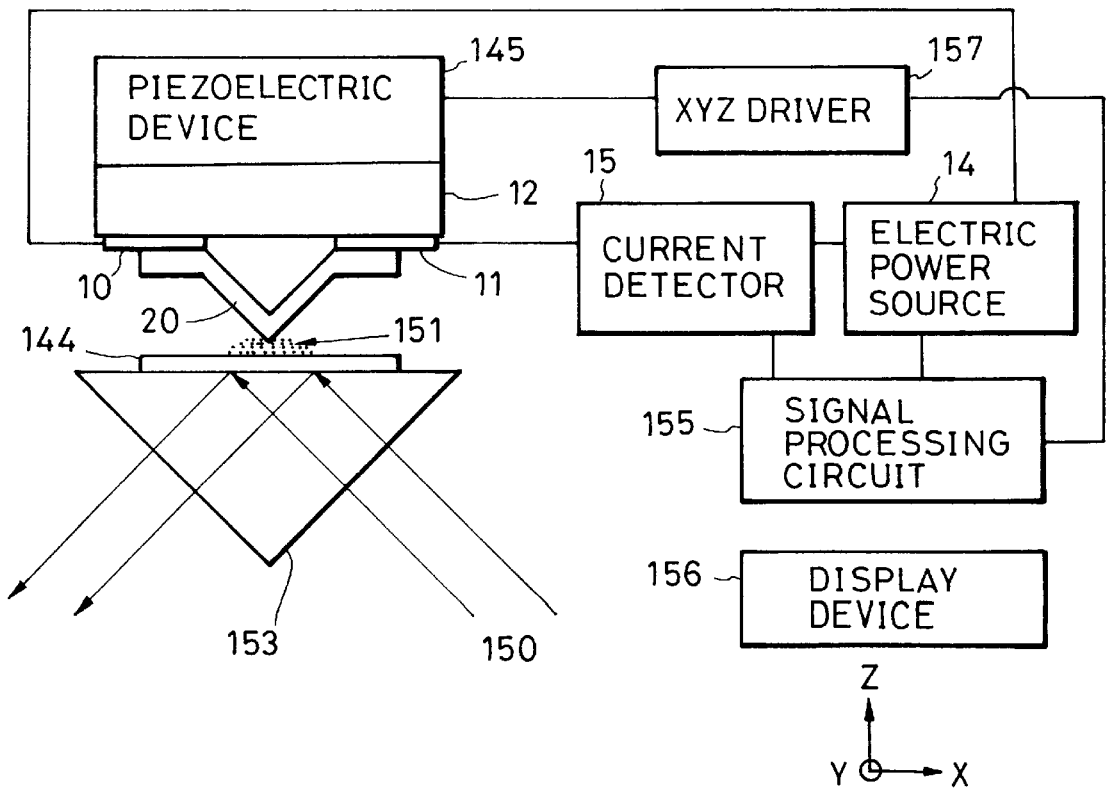
FIG. 3B is a block diagram of a near-field scanning optical microscope in accordance with the present invention.

FIG. 3A is an isometric view of an evanescent wave detector including a microprobe chip in accordance with the present invention, and FIG. 3B is a block diagram of a near-field scanning optical microscope using the evanescent wave detector. As shown in FIG. 3A, the evanescent wave detector includes a second substrate 12, a microprobe chip 20 composed of a pyramidal photoconductive material, electrodes 10 and 11 provided under the both ends of the microprobe chip 20, an electric power source 14 which applies a bias voltage to the electrodes 10 and 11, and a current detector 15 which detects the evanescent waves absorbed in the microprobe chip as photocurrent flows.

The near-field scanning optical microscope provided with the evanescent wave detector includes, as shown in FIG. 3B, a prism 153 which also functions as a specimen table, a piezoelectric device 145 which drives the evanescent wave detector in the X, Y and Z directions, an XYZ driver 157 which controls driving of the piezoelectric device 145, and a signal processing circuit 155 which processes signals from the current detector 15 in FIG. 3A and feeds the processed information to a display device 156. The specimen fixed on the prism 153 is irradiated by laser beams 150 for NSOM from the rear surface such that the incident laser beams are totally reflected by the surface, under the specimen, of the prism. Since the near-field scanning optical microscope in accordance with the present invention does not require a photoelectric converter, such as a photomultiplier, the system configuration is simplified.

FIGS. 4A to 4G are cross-sectional views of processes of a method for making the microprobe chip in this embodiment. As shown in FIG. 4A, a silicon wafer with a <100> crystal orientation is prepared as a first substrate, wherein silicon dioxide films as protective layers 2 are previously formed on both surfaces of the first substrate 1 by thermal oxidation in an oxidative gas atmosphere. A photoresist layer is formed thereon as a mask by a photolithographic process, and a given place with a 3-$\mu$m by 3-$\mu$m area of the upper protective film 2 is removed by etching with an aqueous HF solution to expose the silicon film. The protective layer 2 is resistant to etching solutions, and protects the other regions of the surfaces of the silicon film when the first substrate 1 is subjected to anisotropic etching to form an indented section 3 which is used as a female mold of the microprobe chip. After the photoresist layer is removed, the first substrate is immersed into an aqueous 27% potassium hydroxide solution at 80° C. to form the indented section 3, which has a reverse pyramidal shape and consists of (111) crystal planes, by the anisotropic etching.

After removing the protective layers 2 by etching with an aqueous HF solution, a peeling layer 4 composed of a 50-angstrom Ti layer and a 700-angstrom Pt layer is formed on the entire upper surface including the indented section 3 of the first substrate 1 by a sputtering process using Ti and Pt targets, as shown in FIG. 4B.

Next, as shown in FIG. 4C, a photoconductive film 5 with a 1-$\mu$m thickness composed of amorphous silicon is deposited on the entire surface of the peeling layer 4 by a plasma CVD process using a silane gas. The photoconductive film 5 will be used as a microprobe chip later.

A resist pattern is formed thereon by a photolithographic process including applying, exposing and developing of a resist, the photoconductive film 5 is etched by a reactive ion etching process with gaseous $CF_4$ using the photoresist layer as a mask, and then the photoresist layer is removed. A patterned photoconductive layer 7 as shown in FIG. 4D is thereby formed.

A Pyrex glass (trade name: #7059, made by Corning Incorporated) is prepared as a second substrate 12, a 50-angstrom Cr layer, and a 1,000-angstrom Au layer are separately deposited onto the second substrate by an electron beam evaporation process, and are patterned by photolithography and etching to form electrodes 10 and 11, as shown in FIG. 4E. The electrodes function as junction layers between the substrate and the microprobe chip.

The photoconductive layer 7 provided on the first substrate 1 is put into contact with the electrodes 10 and 11 by inverting the first substrate 1, as shown in FIG. 4F, and allowed to stand at 100° C. for 1 hour. Heating while pressing the first and second substrates helps formation of silicide by the reaction of Au with silicon at the interface between the photoconductive layer 7 and the electrodes 10 and 11. As a result, the photoconductive layer 7 is joined to the electrodes 10 and 11. Finally, the substrate 1 with the peeling layer is removed, as shown in FIG. 4G. A microprobe chip is formed in such a manner. Since Au is highly reactive with silicon as compared with Pt, the interface between the Pt layer and the amorphous silicon layer will peel off when the first substrate is removed from the second substrate. Since glass is used as the second substrate in the present invention, the photoconductive layer 7 can be easily positioned.

The microprobe chip 20 in accordance with the present invention was observed with a scanning electron microscope (SEM). The tip had a replicated shape of the reverse-pyramid which was formed by anisotropic etching of crystal silicon, and it had a curvature radius of 0.03 $\mu$m. The sharpness of the tip was therefore satisfactorily replicated. The microprobe chip 20 has a space 13 as shown in FIG. 4G.

As shown in FIG. 3B, an NSOM image of a compact disc 144 made of polycarbonate was observed by a near-field scanning optical microscope using the microprobe chip 20 in accordance with this embodiment. The compact disc 144 was irradiated with HeNe laser beams as NSOM laser beams 150. An excellent NSOM image of the pits and gratings on the compact disc was observed with a high resolution of less than 40 nm.

[Embodiment 2]

Another embodiment of a method for making a microprobe chip in accordance with the present invention will now be described.

FIGS. 5A to 5F are cross-sectional views of production steps of a microprobe chip composed of chalcogenide glass, i.e., Se. The indented section 23 on the first substrate 21 is formed as in FIG. 4A. The first substrate 21 is composed of a silicon wafer having a <100> crystal orientation plane, and a silicon dioxide film as a protective layer is formed thereon by thermal oxidation in an oxidizing gas atmosphere. The silicon dioxide film is etched with an aqueous HF solution using a photoresist mask formed by a photolithographic process to expose a 3-$\mu$m by 3-$\mu$m m area of the silicon wafer.

Figure 5A:
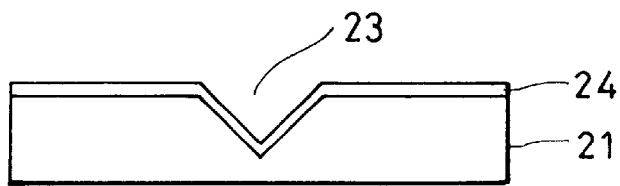
FIGS. 5A to 5F are cross-sectional views of manufacturing steps of a microprobe chip in accordance with Embodiment 2 of the present invention.

After the photoresist layer is removed, the first substrate is immersed into an aqueous 27% potassium hydroxide solution at 80° C. to form an indented section 23, which has a reverse-pyramidal shape and consists of (111) crystal planes, by anisotropic etching. After removing the silicon dioxide film by etching with an aqueous HF solution, a 700-angstrom peeling layer 24 composed of Ag is formed on the entire upper surface including the indented section 23 of the first substrate 21 by a resistant heating evaporation process, as shown in FIG. 5A.

Figure 5B:
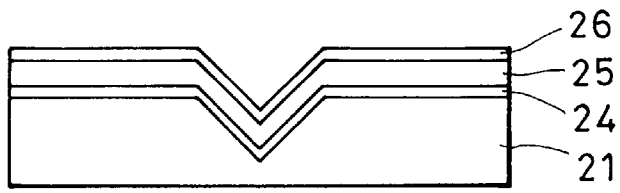

Next, as shown in FIG. 5B, a 1-$\mu$m Se photoconductive film is deposited thereon by a resistant heating evaporation process, and a 50-angstrom Cr layer and a 1,000-angstrom Au layer are separately deposited on the photoconductive film 25 by an electron beam deposition process to form a metallic thin film 26.

The metal thin film 26 helps joining of the Se photoconductive film 25 to Au electrodes which will be provided later. An alloy must be formed at the interface between Se and Au for satisfactory joining. Since Se has a low crystallization temperature, annealing at a high temperature for joining causes crystallization of Se and thus causes decreased photoconductivity. Intervention of the metallic thin film 26 permits joining Se with the electrodes at a lower temperature.

Figure 5C:
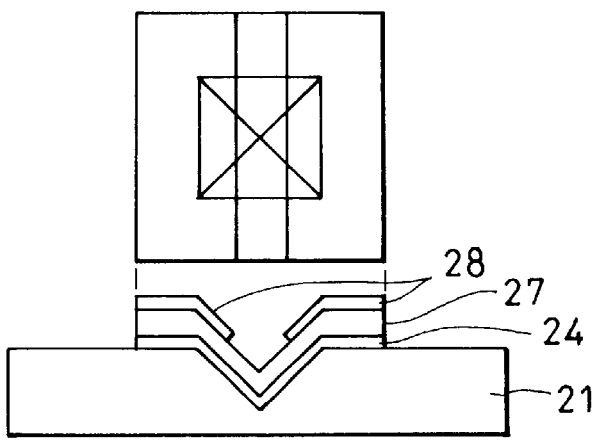

A resist pattern is formed on the metallic thin film 25 by a to photolithographic process including applying, exposing, and developing a resist, the metallic thin film 26 with the resist mask is etched by an Ar ion milling process, and the photoresist is removed to form a metallic layer 28. The photoconductive film 25 is also patterned by a photolithographic process and an ion milling process to form a photoconductive layer 27, as shown in FIG. 5C. The metallic layer 28 almost reaches the tip of the indented section of the photoconductive layer 27, as shown in FIG. 5C. The metallic layer 28, which will be connected to electrodes later, permits a reduction of the voltage applied to the photoconductive layer 27 and an increase in the detection speed, since the travel distances of electric charges which are formed by absorption of evanescent waves are decreased by providing the metallic layer 28 near the tip of the indented section. Accordingly, the electrodes are provided on the back surface of the microprobe chip in accordance with the present invention, hence it can almost reach the tip of the microprobe chip.

Figure 5D:
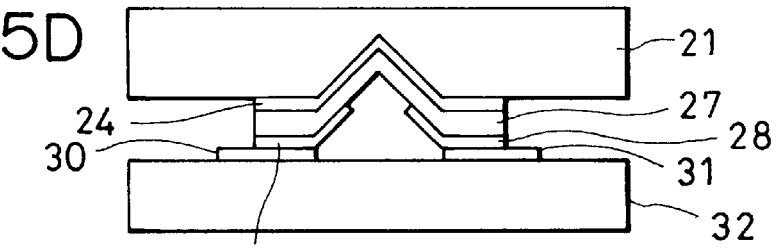
Figure 5E:
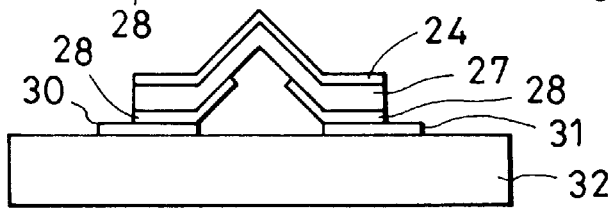
Figure 5F:
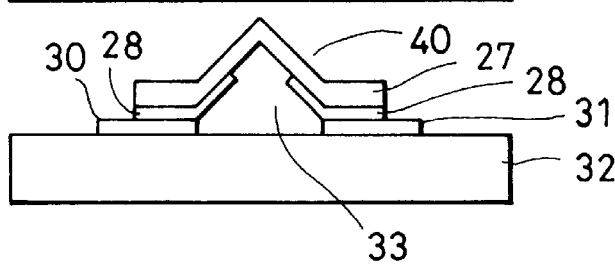

A second substrate 32 provided with electrodes 30 and 31 is prepared as in FIG. 4E, the first substrate is inversely placed on the second substrate so that the metallic layer 28 is put into contact with the electrodes 30 and 31, as shown in FIG. 5D. An Au—Au metallic bond is formed at the interface between the metallic layer and the electrodes by pressing the first and second substrates 21 and 32. The first substrate 21 is removed from the second substrate 32 by peeling between the first substrate 21 and the Ag peeling layer 24. As a result, as shown in FIG. 5C, a microprobe chip 40 composed of the photoconductive layer and the metallic layer is transferred onto the electrodes 30 and 31. The peeling layer 24 is removed by an Ar ion milling process to expose the photoconductive layer as shown in FIG. 5F. A microprobe chip having a space 33 for detecting evanescent waves is formed in such a manner.

The microprobe chip 40 in accordance with the present invention was observed with a scanning electron microscope (SEM). The tip of the microprobe chip had a curvature radius of 0.03 $\mu$m. The sharpness of the tip was therefore satisfactorily replicated.

An NSOM image of the compact disc 144 was observed by the near-field scanning optical microscope using the microprobe chip 40 in accordance with this embodiment, as shown in FIG. 3B. An excellent NSOM image was observed.

Next, an Ag peeling layer was deposited onto the first substrate as the female mold, and another microprobe chip was formed on another second substrate provided with electrodes by the steps shown in FIGS. 5B to 5F. The tip of the microprobe chip had a curvature radius of less than 0.04 $\mu$m and it was equal to that of the first microprobe chip. Accordingly, the first substrate can be reused as the female mold of microprobe chip production with high reproducibility.

[Embodiment 3]

A third embodiment of a method for making a microprobe chip in accordance with the present invention will now be described.

FIGS. 6A to 6F are cross-sectional views of production steps of a microprobe chip composed of copper phthalocyanine (hereinafter referred to as CuPc) which is an organic photoconductive material. The indented section on the first substrate is prepared as in FIG. 4A. The first substrate 41 is a silicon wafer having a <100> crystal orientation plane and provided with a silicon dioxide protective film 42 thereon. The protective film 42 is formed by thermal oxidation of the silicon surface using an oxidizing gas. The silicon dioxide protective film 42 is etched with an aqueous HF solution using a photoresist mask formed by a photolithographic process to expose a 3-$\mu$m by 3-$\mu$m area of the silicon wafer. After the photoresist layer is removed, the first substrate is immersed into an aqueous 27% potassium hydroxide solution at 80° C. to form an indented section 43, which has a reverse-pyramidal shape and consists of (111) crystal planes, by anisotropic etching.

Figure 6A:
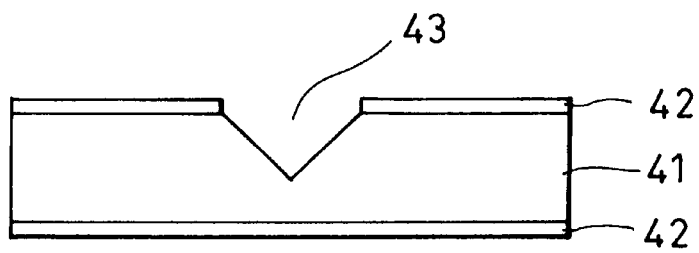
FIGS. 6A to 6F are cross-sectional views of manufacturing steps of a microprobe chip in accordance with Embodiment 3 of the present invention.
Figure 6B:
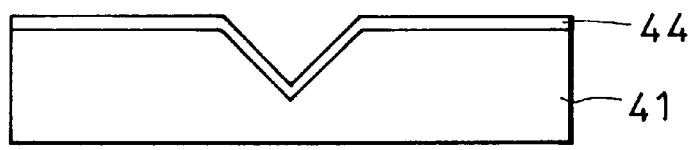

After removing the protective film 42 by etching with an aqueous HF solution, a 5,000-angstrom peeling layer 44 composed of silicon dioxide is formed on the entire upper surface including the indented section 43 of the first substrate 41 by a thermal oxidation process in an oxidizing gas atmosphere, as shown in FIG. 6B. The thickness of the silicon dioxide film formed by thermal oxidation depends on the shape of the silicon, and the curvature of the tip of the microprobe chip is determined by controlling the thickness of the silicon dioxide film. Accordingly, a microprobe chip with a tip having a smaller curvature radius can be produced by forming the silicon dioxide peeling layer 44.

Figure 6C:
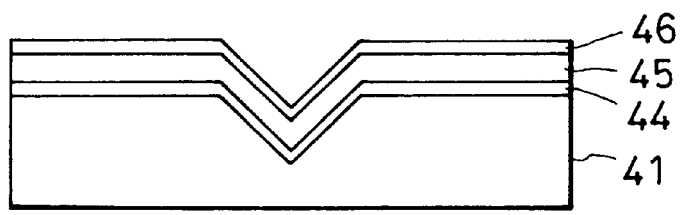

As shown in FIG. 6C, a 1-$\mu$m CuPc photoconductive film 45 is deposited on the peeling layer 44 by a resistant heating evaporation process, and then a 50-angstrom Cr layer and a 1,000 angstrom Au layer are separately deposited thereon by a vacuum evaporation process to form a metallic thin film 46.

Figure 6D:
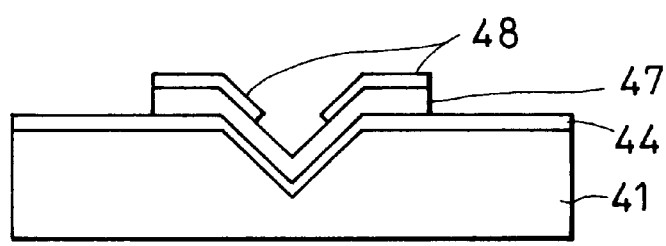

A resist pattern is formed on the metallic thin film 46 by a photolithographic process including applying, exposing, and developing a resist, the metallic thin film 46 with the resist mask is patterned by an Ar ion milling process, and then the photoconductive thin film 45 is patterned by a reactive ion etching process using gaseous oxygen to form a photoconductive layer 47. The photoresist layer on the metallic thin film is removed. The metallic thin film 46 on the photoconductive layer 47 is also patterned by a photolithographic process and an ion milling process to form a metallic layer 48, as shown in FIG. 6D. The metallic layer 48 almost reaches the tip of the indented section of the photoconductive layer 47, as shown in FIG. 6D. The metallic layer 48, which will be connected to electrodes later, permits a reduction of the voltage applied to the photoconductive layer 47 and an increase in the detection speed, since the travelling distances of electric charges which are formed by absorption of evanescent waves are decreased by providing the metallic layer 48 near the tip of the indented section.

Figure 6E:
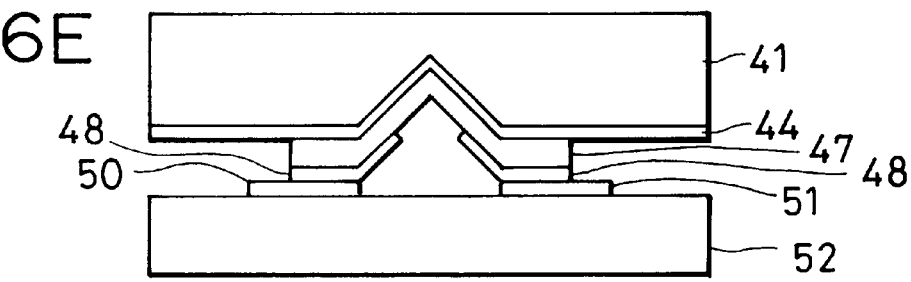
Figure 6F:
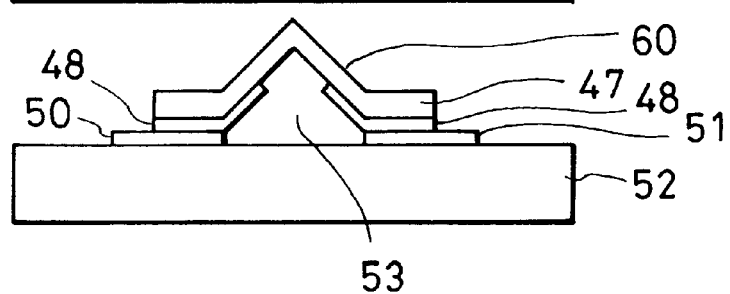

A silicon wafer is prepared as a second substrate 52, and a 50-angstrom Ti layer and 1,000 angstrom Pt layer are deposited and electrodes 50 and 51 as junction layers are formed by a photolithographic process and an Ar plasma etching process of the deposited layers. The first substrate shown in FIG. 6D is inversely placed on the second substrate so that the metallic layer 48 is put into contact with the electrodes 50 and 51, as shown in FIG. 6E. An Au—Pt metallic bond is formed at the interface between the metallic layer and the electrodes by pressing the first and second substrates 41 and 52. The first substrate 41 is removed from the second substrate 52 by peeling between the silicon dioxide peeling layer 44 and the photoconductive layer 47. As a result, as shown in FIG. 6F, a microprobe chip 60 composed of the photoconductive layer and the metallic layer is transferred onto the electrodes 50 and 51. A microprobe chip 60 having a space 53 for detecting evanescent waves is formed in such a manner.

The microprobe chip 60 in accordance with the present invention was observed with a scanning electron microscope (SEM). The tip of the CuPc microprobe chip had a curvature radius of 0.03 $\mu$m. The sharpness of the tip was therefore satisfactorily replicated.

An NSOM image of the compact disc 144 was observed by the near-field scanning optical microscope using the microprobe chip 60 in accordance with this embodiment, as shown in FIG. 3B. An excellent NSOM image was observed.

[Embodiment 4]

This embodiment includes a method for making a probe for detecting evanescent waves, in which a microprobe chip composed of an amorphous silicon photoconductive layer is provided on a thin film cantilever.

Figure 7A:
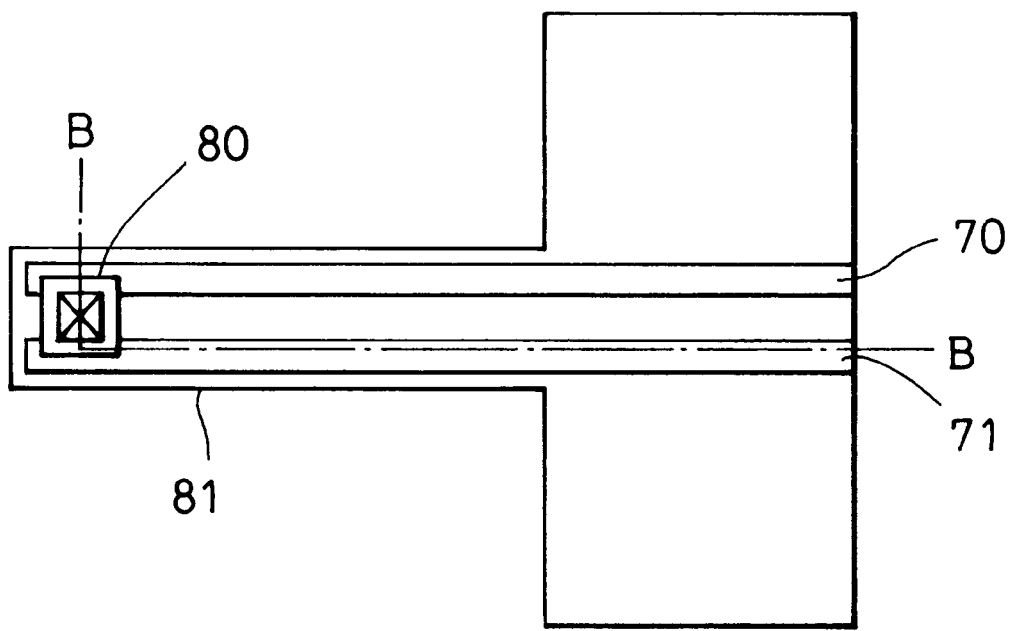
FIGS. 7A and 7B are a top view and a side view, respectively, of a probe for detecting evanescent waves in accordance with the present invention.
Figure 7B:
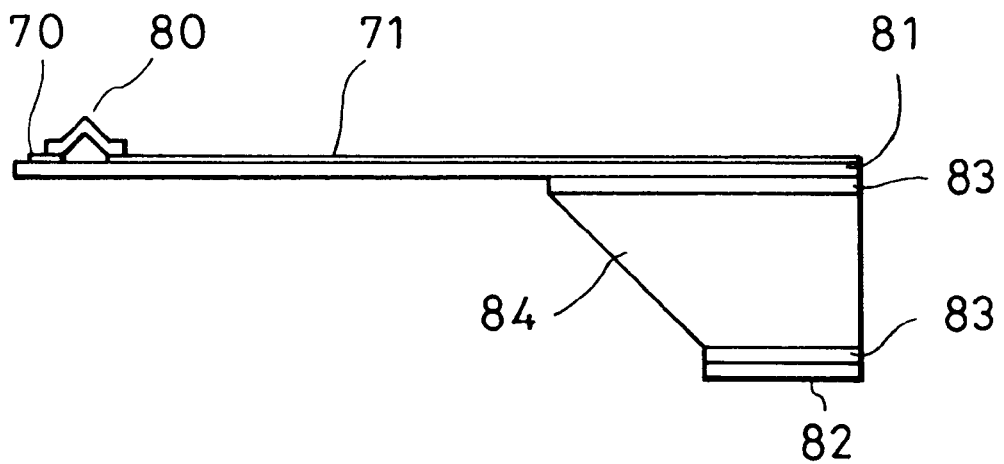

FIGS. 7A and 7B are a top view and a side view, respectively of the probe. The probe includes a thin film cantilever 81, electrodes 70 and 71 which are used as junction layers and lead the photocurrent flows, a microprobe chip 80 composed of an amorphous silicon semiconductive layer, a silicon dioxide film 83, a silicon nitride film 82 which is used as a mask when etching the silicon wafer from the back surface, and a silicon block 84 which is formed by etching the silicon wafer and supports one end of the thin film cantilever 81. The electrodes 70 and 71 are connected to both ends of the bottom of the microprobe chip.

The production steps will now be described with reference to FIGS. 8A to 8D. A photoconductive layer is formed on the peeling layer by the steps shown in FIGS. 4A to 4D, and a 1-$\mu$m amorphous silicon layer as a photoconductive layer is deposited on the PtTi peeling layer.

Figure 8A:
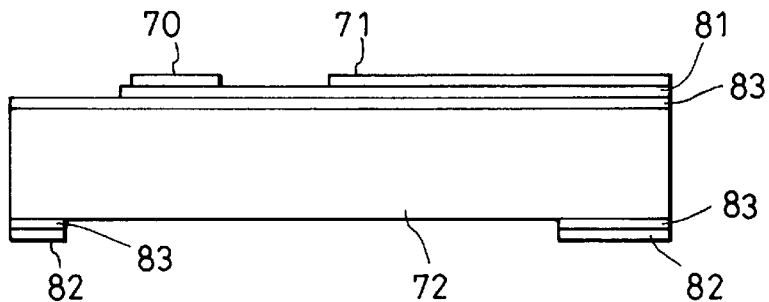
FIGS. 8A to 8D are cross-sectional views of manufacturing steps of a microprobe chip in accordance with Embodiment 4 of the present invention.

A 0.5-$\mu$m silicon dioxide film 83 is deposited on a silicon wafer as a second substrate 72, and then 0.5-$\mu$m silicon nitride films are deposited on the both surfaces of the second substrate 72 by a low pressure CVD process. The upper silicon nitride film is used as the thin film cantilever 81, and the lower silicon nitride film 82 is used as a mask when the back surface of the second substrate 72 is anisotropically etched along the crystal axes. The upper silicon nitride film is patterned by a photolithographic process and then the thin film cantilever 81 as shown in FIG. 7A is patterned by a reactive ion etching process using $CF_4$. The silicon nitride film 82 and the silicon dioxide film 83 on the bottom surface of the second substrate are partially patterned as shown in FIG. 7B by a photolithographic process and a reactive ion etching process. A 50-angstrom Cr layer and a 1,000-angstrom Au layer are separately deposited on the thin film cantilever 81 by an electron beam evaporation process, and patterned by a photolithographic process and an etching process to form electrodes 70 and 71 as shown in FIG. 8A.

Figure 8B:
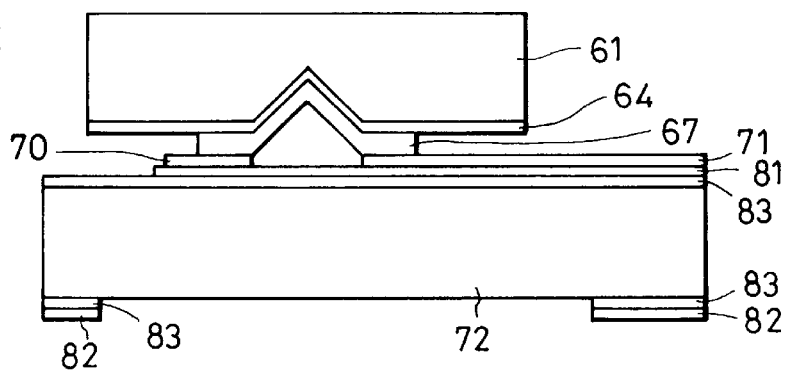
Figure 8C:
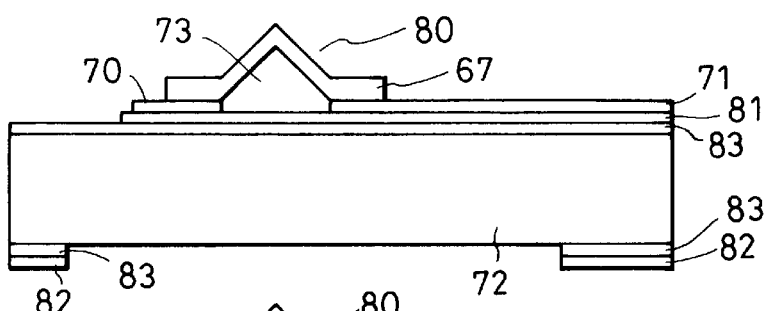
Figure 8D:
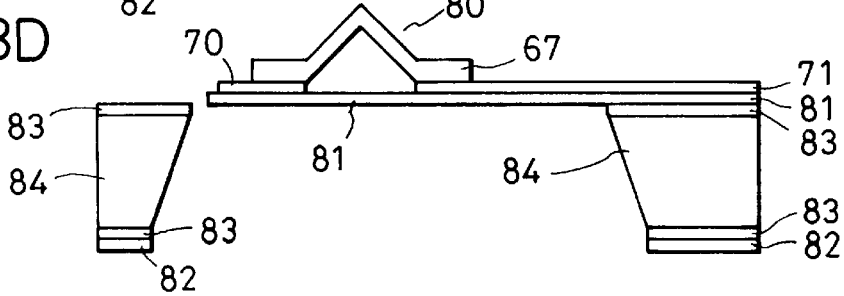

The photoconductive layer 67 on the first substrate 61 with the peeling layer 64 is placed on the electrodes 70 and 71 on the second substrate 72 by inverting the first substrate 61, as shown in FIG. 8B. The photoconductive layer 67 is joined to the electrodes 70 and 71 by pressing the first and second substrates 61 and 72 while bring maintained at 100° C. for 1 hour. When the first substrate is removed from the second substrate, the photoconductive layer on the peeling layer is transferred onto the electrodes. A microprobe chip 80 is formed in a manner as shown in FIG. 8C.

The bottom surface of the second substrate composed of silicon is etched by an anisotropic etching process using an aqueous potassium hydroxide solution, and the silicon dioxide film of the bottom surface is removed with an aqueous HF solution.

In such a manner, a probe is formed, in which the microprobe chip 80 is provided on the free end of the thin film cantilever and the other end is fixed to the silicon block 84. The resulting probe for detecting evanescent waves can be used as a probe for an AFM. The laser beams for measuring displacement can be reflected of the bottom surfaces of the electrodes provided on the tip of the thin film cantilever, hence the probe can be used as a reflecting film.

Figure 9:
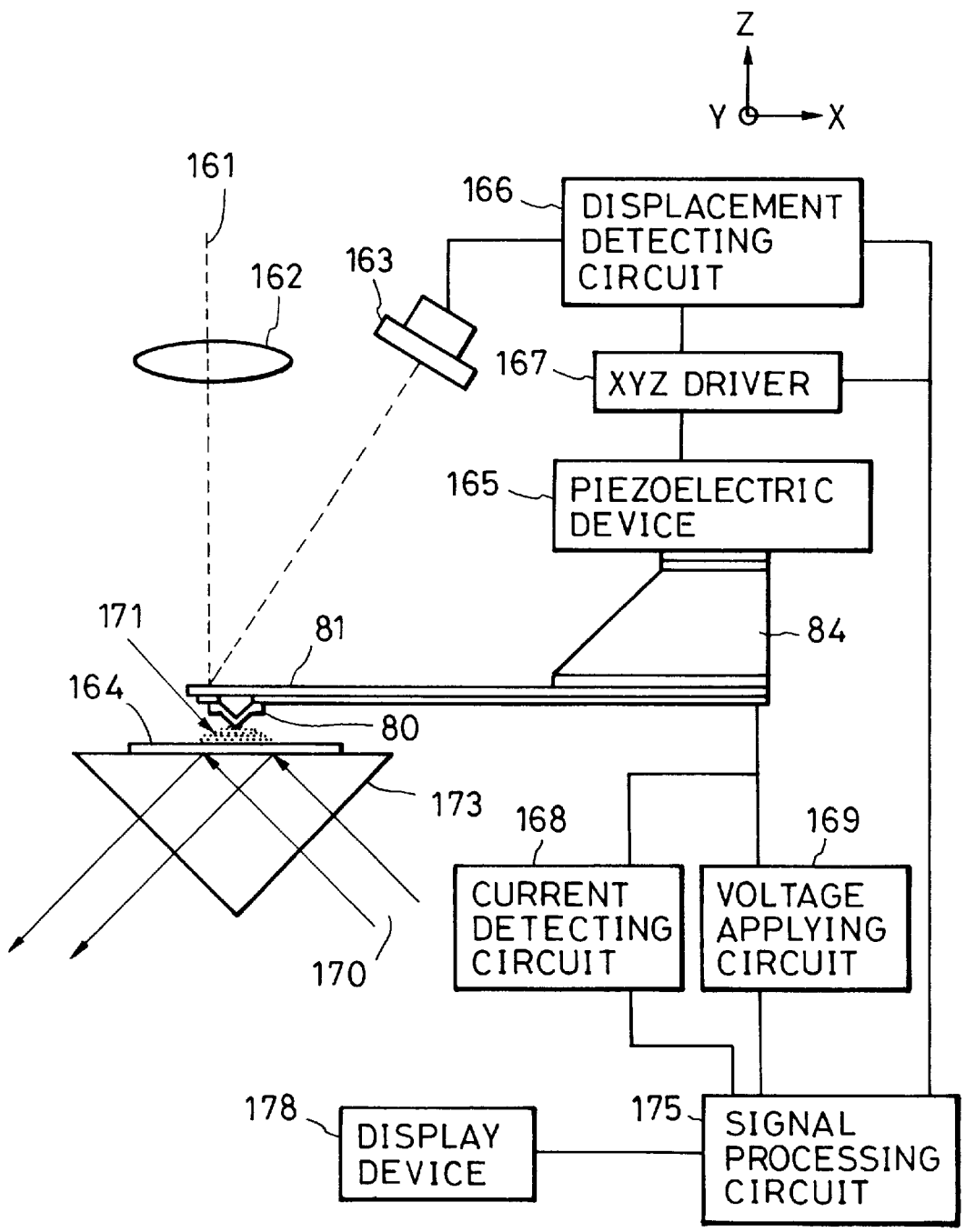
FIG. 9 is a block diagram of a near-field scanning optical microscope provided with the microprobe chip of the Embodiment 4 in accordance with the present invention.

A near-field scanning optical microscope provided with the probe in accordance with the present invention was fabricated for simultaneously observing an AFM image and an NSOM image, wherein the AFM image is observed by an optical lever system. FIG. 9 is a block diagram of the near-field scanning optical microscope which has the same configuration as that in FIG. 3B. That is, the microscope includes a prism 173, a voltage applying circuit 169 applying a voltage between the electrodes 70 and 71 at both ends of the microprobe chip on the probe, a current detecting circuit 168 detecting photocurrent flows generated from evanescent waves, a piezoelectric device 165 driving the probe in the X, Y and Z directions, and an XYZ driver 167 controlling the drive of the piezoelectric device 165. HeNe laser beams 170 are radiated onto the rear face of a test piece 164 attached to the prism 173.

The probe is provided with some units for measuring displacement of the cantilever in the AFM mode, that is, a laser beam source 161, a lens 162 collecting laser beams on the bottom surface of the free end of the thin film cantilever, a position sensor 163 detecting a change in the reflecting angle of light caused by the displacement of the thin film cantilever, and a displacement detecting circuit 166 detecting the displacement based on the signals from the position sensor 163.

A signal processing circuit 175 processes signals from the XYZ driver 167, the displacement detecting circuit 166 and the current detecting circuit 168 and displays an AFM image and an NSOM image using a display device 178.

Since the near-field scanning optical microscope in accordance with the present invention does not require a photoelectric converter, such as a photomultiplier, the system configuration can be simplified. Further, an optical system and a displacement detecting circuit for observing AFM images can be provided in the space which would otherwise be occupied by the photoelectric converter.

Using the microscope, the probe was moved close to the compact disc as the test piece 164, and the probe was scanned in the X and Y directions by the piezoelectric device 165 to simultaneously perform NSOM and AFM observation. An AFM image of pits and gratings was obtained by the displacement of the probe and an NSOM image with a high resolution of less than 40 nm was simultaneously obtained.

Since the bits on the compact disc are detected, the recorded information can be regenerated by decoding the detected bits by the signal processing circuit 168. Accordingly the system can be also used as an information regenerating apparatus.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. A microprobe chip for detecting evanescent waves comprising a photoconductive layer which consists of a photoconductive material, wherein said photoconductive layer is supported on a substrate with electrodes.

2. A microprobe chip for detecting evanescent waves comprising a photoconductive layer which consists of a photoconductive material, wherein said photoconductive layer is supported on a substrate with electrodes, and
   wherein said photoconductive material is an amorphous semiconductive material.

3. A microprobe chip according to claim 2, wherein said amorphous semiconductive material comprises amorphous silicon or amorphous chalcogenide.

4. A microprobe chip for detecting evanescent waves comprising a photoconductive layer which consists of a photoconductive material, wherein said photoconductive layer is supported on a substrate with electrodes, and wherein said photoconductive material comprises an organic photoconductive material.

5. A microprobe chip for detecting evanescent waves comprising a photoconductive layer which consists of a photoconductive material, wherein said photoconductive layer is supported on a substrate with electrodes, and wherein said microprobe chip has a pyramidal shape.

6. A probe provided with the microprobe chip of claim 1, comprising a cantilever for supporting the microprobe chip on a free end thereof.

7. An apparatus for detecting evanescent waves comprising:
- a microprobe chip comprising a photoconductive material;
- a substrate provided with electrodes thereon for supporting said microprobe chip;
- a means for applying a voltage to said microprobe chip through said electrodes; and
- a means for detecting photocurrent flows in said microprobe chip through said electrodes,
- wherein said evanescent waves are detected as said photocurrent.

8. An apparatus for observing a surface of a test piece using evanescent waves, comprising:
- a microprobe chip comprising a photoconductive material and having a tip;
- a substrate provided with electrodes thereon for supporting said microprobe chip;
- a means for radiating light onto the test piece;
- a means for applying a voltage to said microprobe chip through said electrodes; and
- a means for detecting photocurrent flows in said microprobe chip through said electrodes,
- wherein evanescent waves occurring on the test piece responsive to irradiation with light are converted into photocurrent by said means for applying a voltage and said microprobe chip, and are detected as said photocurrent to provide surface information relating to the test piece.

9. An apparatus for regenerating information on a recording medium using evanescent waves, comprising:
- a microprobe chip comprising a photoconductive material and having a tip;
- a substrate provided with electrodes thereon for supporting the said microprobe chip;
- a means for radiating light onto the recording medium;
- a means for applying a voltage to said microprobe chip through said electrodes; and
- a means for detecting photocurrent flows in said microprobe chip through the electrode,
- wherein the evanescent waves occurring on the recording medium responsive to irradiation with light are converted into photocurrent by said means for applying a voltage and said microprobe chip, and are detected as said photocurrent to regenerate the information on the recording medium.

10. An apparatus according to any one of claims 7 to 9, wherein said photoconductive material is an amorphous semiconductive material.

11. An apparatus according to claim 10, wherein said amorphous semiconductive material comprises amorphous silicon or amorphous chalcogenide.

12. An apparatus according to any one of claims 7 to 9, wherein said photoconductive material comprises an organic photoconductive material.

13. An apparatus according to any one of claims 7 to 9, wherein said microprobe chip has a pyramidal shape.

* * * * *